UNITED STATES PATENT OFFICE.

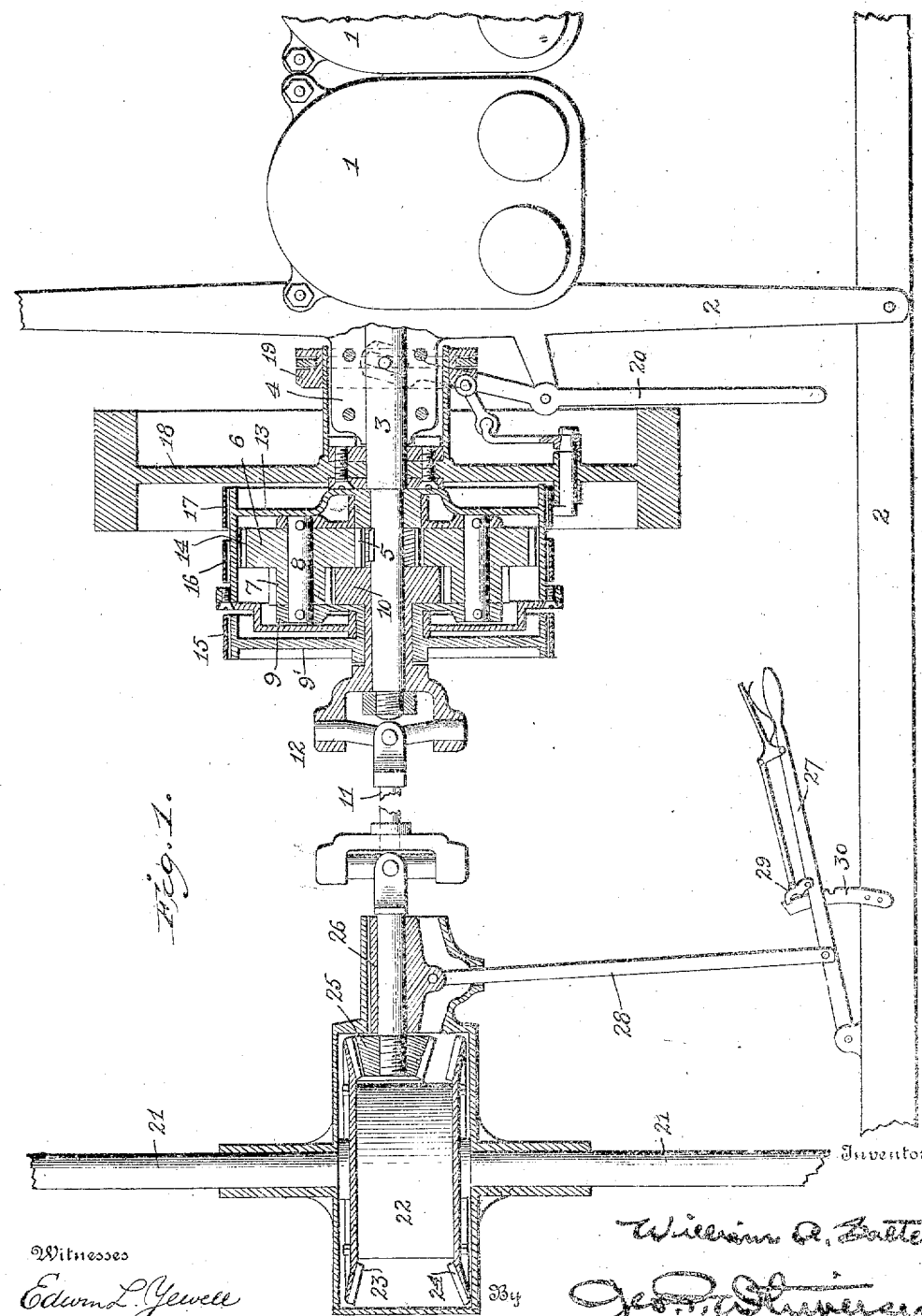

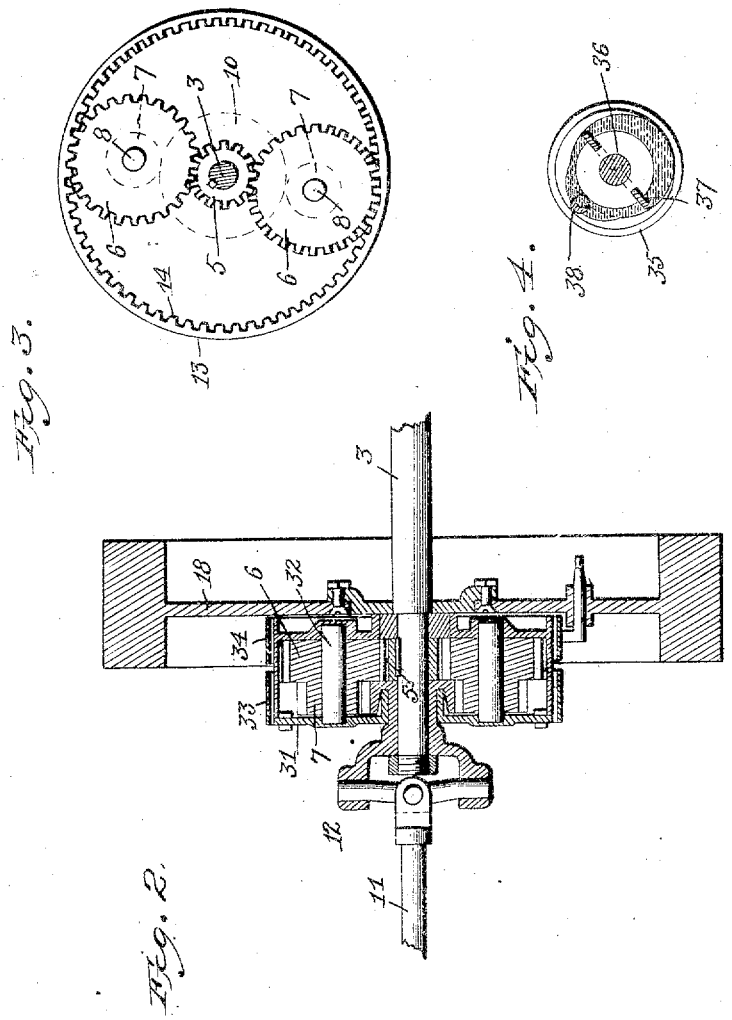

WILLIAM A. SALTER, OF CEDAR POINT, KANSAS.

SPEED CHANGING AND REVERSING GEARING.

No. 888,750.  Specification of Letters Patent.  Patented May 26, 1908.

Application filed February 12, 1907. Serial No. 356,983.

*To all whom it may concern:*

Be it known that I, WILLIAM A. SALTER, a citizen of the United States, residing at Cedar Point, in the county of Chase and State of Kansas, have invented new and useful Improvements in Speed Changing and Reversing Gearing, of which the following is a specification.

This invention relates to an improvement in transmission and reversing gears, and has for its object, to provide certain new and useful improvements in the construction, form and arrangements of the several parts and mechanisms, so that an efficient, simple and durable means is provided, whereby a power member, rotating constantly in one direction, is caused to impart varying speeds in either direction to a rotating driven member.

Many different means have heretofore been proposed to accomplish this result, but this invention contains elements of novelty and simplicity and completeness which render it a distinct improvement in the art. While there have been other change speed means proposed providing for imparting to the driven member different speeds forward and reverse, they generally only provide for one, two and three speeds forward and one reverse, while in this invention, I have as many speeds on the reverse as there are on the forward movement of the driven member, and at the same varying relative rotations.

The present invention is an improvement on an invention of mine in reverse gears for which Letters Patent of the United States were granted to me May 7th, 1907, No. 853,120.

Broadly speaking, my invention consists of two elements brought together and working as one mechanism, for the attainment of one complete result. The first element in the series is a power driving member, connected by a speed changing means to a revolving shaft, which shaft always revolves in the same direction as the driving member, but through the speed changing means is capable of control through varying ratios of rotation, relative to the rotation of the driving member.

The second element of the invention produces the reverse and forward movements for the final driven member. This reverse gear is the subject of the aforesaid application, and provides a driven member with two facing bevel gears secured together, and a bevel pinion of smaller diameter than the distance between the facing bevel gears. Said bevel pinion is secured to the variable speed revolving shaft, above spoken of, and is journaled in a bearing capable of being moved laterally, so as to bring the bevel pinion into engagement with either one of the facing bevel gears, releasing it at the same time from the other one. As the bevel pinion always revolves in one direction of rotation, when engaged with one of the facing bevel gears of the driven member it causes the latter to rotate in one direction, but when the bevel pinion is moved into engagement with the other facing bevel gear, it causes the driven member to rotate in the reverse direction.

In carrying out the details of this invention, I have preferably adopted that form of speed changing means, wherein the various speeds can be attained without the need of shifting gears, and wherein when the high speed is attained, the whole mechanism revolves as a whole or unit, acting as a balance wheel, conserving power and securing very steady running.

While the exact arrangement herein shown is, I believe, the simplest for the results it accomplishes, it is capable of many modifications, yet embodying the spirit and substance of the invention, and the equivalents thereof.

Referring to the drawings forming a part of this specification Figure 1 is a sectional top plan view of a chassis partly broken away, showing in detail the arrangement of the invention giving three forward speeds and three reverse speeds. Fig. 2 is a modification thereof giving only two forward and two reverse speeds. Fig. 3 is a sectional end view showing the arrangement of gears in Fig. 1 relative to the speed changing means, and Fig. 4 shows an equivalent of the speed changing means shown in Fig. 1 and Fig. 2, it being a hydraulic clutch used in lieu of gear changing means, acting in the same manner and attaining the same ends.

The motor 1 is suitably mounted on the frame 2 of the chassis and its shaft 3 is extended back through and beyond the bearing 4. Keyed to this shaft is a driving pinion 5 which meshes with the gear 6 of the connected gear 6 and pinion 7, journaled on a counter shaft 8 which is mounted in a cage 9. There are preferably two sets of these gears, as shown, and the pinion in each set meshes with a driven spur gear 10 sleeved on the shaft 3 and carrying one part of a coupling by which it is connected with the rearwardly extending driving shaft 11. The coupling is, preferably, a universal joint 12.

A casing 13 surrounds the gearing, and is provided with an internal gear 14 meshing with the gears 6. The casing and the cage are both rotatable concentric with the shaft 3, and the cage has a drum 9' outside of the casing. Encircling this drum is a band brake 15, by means of which the revolution of the cage can be checked at the will of the operator. Two band brakes surround the casing, one of which, 16, is stationary, while the other, 17, is mounted on and rotates with the fly-wheel 18, which is secured to the shaft 3 of the motor. A sliding collar 19, controlled by a lever 20, enables this latter brake to be applied and released.

This construction provides for three speeds of the driving shaft 11. When the band 15 is tightened and the cage 9 is held stationary, the pinions 5, and the gears 6, 10, operate like an ordinary back gearing, and drive the shaft 11 at a slow speed. When the band 16 is tightened, the casing 13 is held stationary, and the cage revolves slowly, the gear 10 being driven at a more rapid rate than before. When the band 17 is tightened, the casing is locked to the motor shaft and revolves at the same speed, carrying the gears and cage with it and imparting to the driven shaft 11 the same speed as that of the motor shaft, or what may be called a direct drive. Under these last conditions the weight of the gears, cage and casing is added to that of the fly-wheel and assists in imparting steadiness of running.

The driving shaft 11 terminates near the driven-shaft 21, which may be provided with a drum 22, provided with two bevel gears 23, 24, facing each other. Between them is located a driving pinion 25, secured to the driving shaft 11, and of such a diameter that it engages only one of said bevel gears at a time. It is capable of being shifted from one to the other by reason of the laterally movable bearing 26 in which the driving shaft 11 is journaled at its rear end. The bearing may be shifted by any suitable mechanism, but I have shown a simple hand lever 27 connected with the bearing by a rod 28 and having a latch 29 engaging with notches in a quadrant 30. In practice this lever would be placed within convenient reach of the operator of the mechanism. The illustration is, of course, diagrammatic.

As the driving shaft always rotates in the same direction, a reversal of movement of the mechanism can be secured by simply shifting the pinion 25 from the bevel gear 23 to the bevel gear 24. The three speeds which can be imparted to the driving shaft are thus available not only in running forward but in the reverse.

In the modification shown in Fig. 2, the casing 31 has no internal gear, and serves as the cage in which are mounted in the counter shafts 32 on which the gears 6 and pinions 7 are journaled. One of the band brakes 33 serves to hold the casing stationary, and the other, 34, to lock it to the fly-wheel. This construction thus gives only two speeds.

In the modification shown in Fig. 4, the gearing is replaced by a hydraulic clutch. In a casing 35 secured to the driving shaft is an eccentric motor shaft 36 on which is carried a piston or vane 37 capable of sliding diametrically with reference to said motor shaft and fitting at its edges the interior of the casing. A body of oil or the like fills the casing and is caused to circulate by the rotation of the piston. A valve 38 provides for retarding the circulation of the oil either partially or totally, so that the driven member (the casing) can be rotated at various controlled speeds relative to the rotation of the driving member (the piston). This arrangement gives an indefinite range of speeds.

This construction of the different parts, makes a very compact highly efficient and meritorious mechanism, and as the planetary change-speed mechanism is of a very short length axially, it follows that by having the controlling lever 20 and the sliding collar 19 located on the opposite side of the balance wheel from the planetary change speed mechanism, next to the motor, the whole can without undue length be carried on the motor driving shaft, thus conserving power and eliminating friction.

Having thus described my invention, what I claim is:—

1. In a change speed transmission mechanism, the combination of a driving shaft, a tubular driven shaft sleeved thereon, a small pinion mounted on and rotating with the driving shaft, a larger gear connected with the driven shaft, a stepped gear connecting said pinion on the driving shaft and gear on the driven shaft and mounted to rotate about the axis of the driving shaft and also about an independent axis, a casing rotatable about the axes of the shafts and provided with an internal gear meshing with larger of the pinions of the stepped gear, means for preventing said casing from rotating, other means for preventing said stepped gear from rotating about the axis of the driving shaft, and means mounted upon and rotating with the driving shaft and adapted to engage with the casing in order to lock the same to said shaft.

2. In a change-speed gear, the combination of a driving shaft rotated in one direction only a driving-pinion thereon, a balance wheel on said shaft, planetary speed-changing mechanism meshing with said pinion, a clutch carried by said balance wheel and adapted to engage with said speed-changing mechanism, and means for operating said clutch located on the opposite side of said wheel from the speed-changing mechanism.

3. In a change-speed gear, the combination of a power driving shaft a power driving-pinion thereon, a balance wheel also secured to said shaft, an intermediate spur gear adapted to revolve on said shaft, a planetary gear-carrying cage journaled to revolve concentric with said driving shaft, stepped speed-reducing gears journaled in said cage and meshing with the driving-pinion and the spur gear, means for retarding the rotation of said cage, a clutch for locking said speed-reducing gears to the balance wheel, and means for operating said clutch located on the opposite side of said wheel from said gears.

4. In a change-speed gear, the combination of a power driving shaft a driving-pinion thereon, of a balance wheel also secured to said shaft, an intermediate spur gear adapted to revolve on said shaft, a planetary gear-carrying cage journaled to revolve on said shaft concentric therewith, stepped speed-reducing gears journaled in said cage and meshing with the driving-pinion and the spur gear, an outer casing journaled to revolve concentric with the driving shaft, an accelerating internal gear carried by said casing and engaging with the stepped gears, a band brake for retarding the rotation of the cage, a band brake for retarding the rotation of the casing, a clutch carried by said balance wheel and adapted to lock said casing to said wheel, and means for operating said clutch located on the opposite side of said wheel from said casing.

5. The combination with a power-driven shaft, of a pinion secured thereon, a sleeve on said shaft, a gear wheel at one end of said sleeve and a shaft coupling at the other, a gear-carrying cage rotatable on said shaft and sleeve, and having a hub concentric with said sleeve, one or more counter-shafts carried by said cage, a stepped gear on each counter-shaft, the larger part of said stepped gear meshing with said pinion, and the smaller part with said gear-wheel on said sleeve, a casing inclosing said pinion and gears and rotatable on said shaft and the hub of said cage, a fly-wheel on said shaft, a band clutch carried by said fly-wheel and engaging with the outside of said casing, a stationary band brake adapted to engage with the outside of said casing, and another stationary band brake adapted to engage with the hub of said cage.

In testimony whereof I have signed my name to this specification in the presence of two subscribing witnesses.

WILLIAM A. SALTER.

Witnesses:
 MATIE A. SALTER,
 JOHN B. HANNA.